Feb. 15, 1949.  E. H. ROSE  2,462,003
UNIVERSAL GAUGE HOLDER
Filed March 27, 1944  2 Sheets-Sheet 1

INVENTOR.
Edward H. Rose
BY Edwin Coates
ATTORNEY

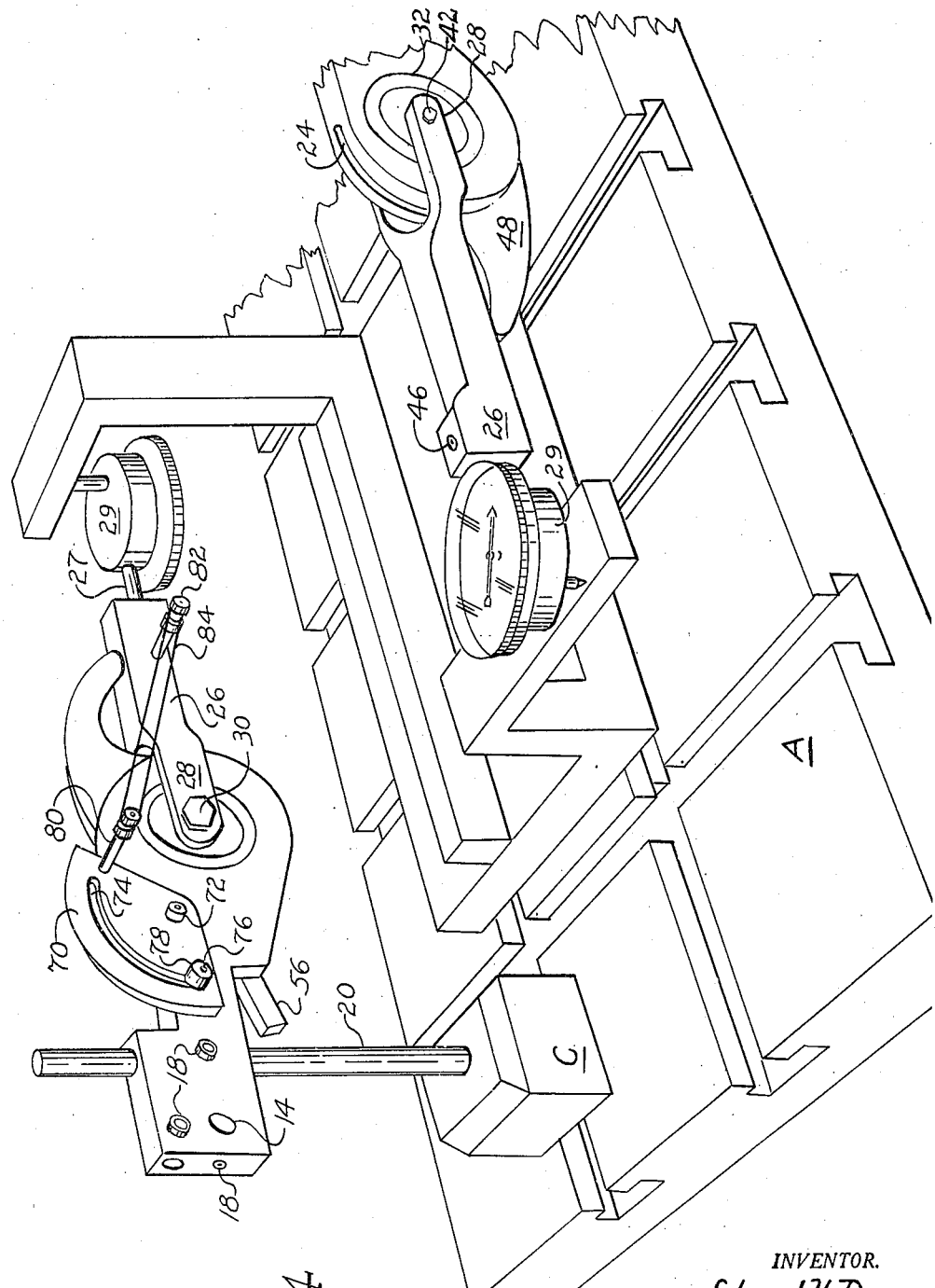

Patented Feb. 15, 1949

2,462,003

UNITED STATES PATENT OFFICE 2,462,003

UNIVERSAL GAUGE HOLDER

Edward H. Rose, Santa Monica, Calif., assignor to Douglas Aircraft Company, Inc., Santa Monica, Calif.

Application March 27, 1944, Serial No. 528,285

15 Claims. (Cl. 248—125)

This invention relates to inspection equipment and particularly to means for holding gauges of the indicator type so that they may be readily moved into and out of engagement with the work, may be readily moved about the work to be gauged or inspected, and moved from one inspection point to another, or may be conveniently mounted on a machine for fabricating the part to be tested.

The inspection of work to ensure that set standards of accuracy are met involves the need of providing a variety of devices either as separate pieces of equipment or as combinations of elements in one construction, which combination is known as a test jig. To consider the simplest case first, to inspect a part of small dimensions having only one critical dimension such as a rectangular block which must be accurate as to thickness to the thousandth of an inch, a test set up might be made consisting of a standard mounted on a face plate and carrying an arm fitted with a dial type indicator. The work piece would be placed on the work table and the arm lowered on the standard to a predetermined point at which the reading of the indicator would be taken. It will be evident that the arm carrying the dial indicator would require to be reset for each piece inspected.

A slightly more complicated but still very usual construction might, according to present practice, require the fabrication of a test jig. A small A bracket bearing having base plates at the ends of the legs set to an angle and a bore at the apex of the A, would require a jig comprising points which would have to be touched by the bracket to check for correct tilt of the bracket in two planes at right angles, and for trueness of the bore. Such a jig, because of the careful design and machining necessary, would cost in excess of $200 and could only indicate whether the brackets tested were accurate or not but could afford little or no indication of the magnitude and character of the various inaccuracies in a part which did not fit the jig.

It is the general object of the invention to provide a gauging device comprising a gauge holder capable of bringing a gauge or gauges against any part of a piece to be inspected so that the accuracy of each critical dimension may be readily and quickly checked, thus enabling the cause of any inaccuracy to be determined and in many cases to show that minor reworking can be done which will produce an accurate part and thus save the part from being wasted.

An object of the invention is to provide a gauge holder comprising a swinging arm carrying an indicator gauge and an adjustable stop for said arm whereby the indicator gauge may be swung against a master part and then against a succession of duplicates of said master part with substantially equal pressure and thus enable an accurate gauge reading to be obtained of any deviation plus or minus of each part from said master part.

A further object of the invention is to provide a gauge holder comprising an adjustable stop element for a swinging arm carrying an indicating gauge and resilient means to neutralize the weight of said arm and indicator whereby the gauge may be swung with substantially equal pressure, and from any direction, against the point to be checked.

A still further object of the invention is to provide a gauge holder which can be used to gauge under a large variety of conditions and can be readily supported from a variety of bases or projections used either with a face plate or on a machine producing the part to be checked.

Yet another object of the invention is to provide a gauge holder of the character described of simple and durable construction.

Another object of the invention is to provide a gauge holder of accurate yet inexpensive construction so that the accuracy of the gauge reading is not lessened by errors introduced by shortcomings in the functioning of the gauge holder.

Still other objects and features of the invention may hereinafter appear in the following description and accompanying drawings in which a preferred form of the invention is shown by way of example only. It is to be understood that the scope of the invention is not in any way limited by this illustrative showing but only as defined in the appended claims.

In the drawings,

Figure 4 is a perspective view of a face plate with a part to be inspected for accuracy of machining of both upwardly and downwardly directed surfaces.

Figure 1:
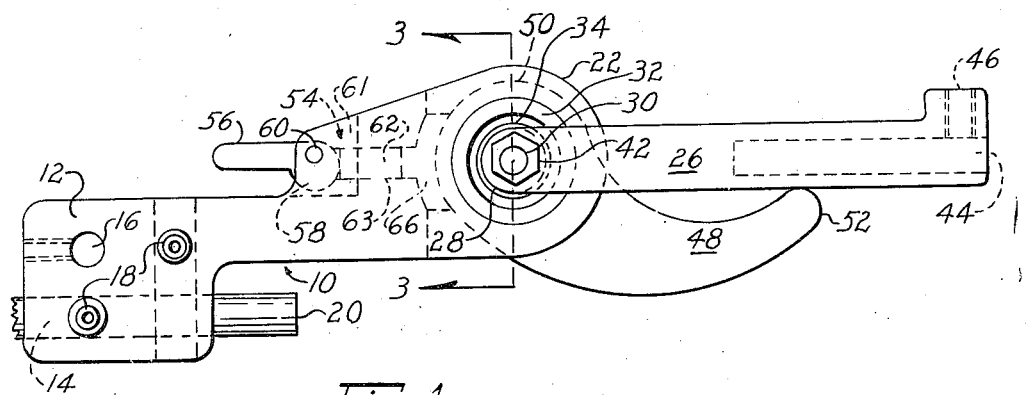
Figure 1 is a view in side elevation of the gauge holder as used when checking or inspecting more or less horizontal and upwardly facing surfaces.
Figure 3:
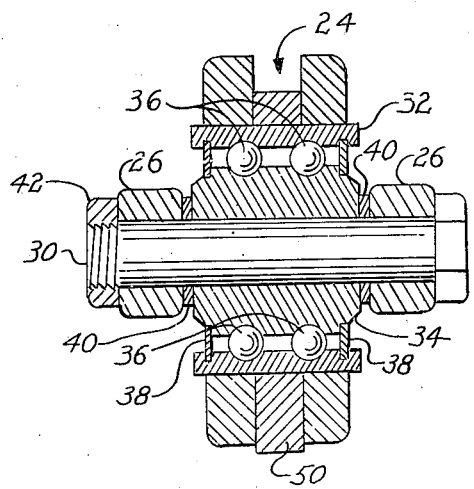
Figure 3 is a cross section on the line 3—3 of Figure 1 and looking in the direction of the arrows.

Referring now to Fig. 1, 10 indicates a supporting arm adapted to be mounted on any suitable support. As shown in the drawing, the supporting arm has a widened end 12 provided with bores 14, 16 at right angles to one another and with set screws 18 positioned so that they may be engaged with the part on which the arm is mounted. As shown in Figure 1, the mount comprises a rod 20 which may be part of a widely used form of mounting clamp. Since this clamp is a standard tool, it will not be further described otherwise than to say that it comprises a C-clamp having a deep groove in the engaging surface of the fixed jaw and a rod projecting from the outside of the fixed jaw. The supporting arm 10 is provided at its opposite end with a head 22 and this head is bifurcated as indicated at 24, Figure 3. A pivoted arm 26 is provided with a yoke at one end which straddles the head 22 and a pivot 30 is passed through the arms of the yoke and through a bore in the bifurcated end of the head.

It is imperative that any play of the pivot in the head be prevented and the construction adopted for this purpose comprises a bushing 32 pressed into a bore in the bifurcated head, this bushing forming the outer race of a double row ball bearing. The inner race 34 of the bearing is provided with a bore which is a close fit for the pivot 30. The double row of balls 36 serve to eliminate any axial or radial play of the pivot member. 38 indicates the usual oil retaining rings enclosing the ball bearing.

Ground washers 40 are arranged between the yoke ends 28 of arm 26 to insure a snug fit of the pivoted arm on the head 22, a nut 42 holding the assembly in place. The outer surface of the bushing 32 is preferably machined to provide a true surface for a purpose later to be described.

The outer end of the arm 26 is provided with a bore 44 adapted to receive the stem 27 (Figure 4) of an indicator type gauge 29 and a set screw 46 is provided to securely retain the indicator stem in said bore. A pivoted stop member 48 is formed as a finger having an enlarged end 50 provided with a bore snugly fitting the outer surface of the bushing 32 and at its outer end is provided with a rounded portion 52 which serves as an adjustable stop which acts to limit movement of the pivoted arm in the direction toward the work to be gauged. While any desired arrangement of parts may be provided to lock the stop 48 in a desired position, I prefer to use the cam and shoe construction indicated at 54 in Figure 1 in dotted lines. This construction includes a lever 56 having a cam 58 pivoted on pin 60, the pivot being arranged to extend across a slot 61 formed in the enlarged head 22 of the supporting arm. A bore 63 is arranged between the slot in which the cam is mounted and the space between the sides of the bifurcated head 22. A short rod 62 is arranged in the bore 63 and preferably is of relatively high stress material. A shoe 66, preferably of a softer material, such as brass, is arranged in a recess opening toward the end of the stop member 48 journaled within said bifurcated head 22. The dimensions of the cam 58, rod 62, and shoe 66 are such that by forcing the lever 56 of the cam toward the supporting arm the rod 62 forces the shoe 66 against the exterior of the enlarged end 50 of the pivoted stop 48 and serves to lock this arm in a desired position. The movement of the lever 56 in the opposite direction will relieve the pressure between the shoe 66 and the stop enabling the stop to be readily moved to another position.

Figure 2:
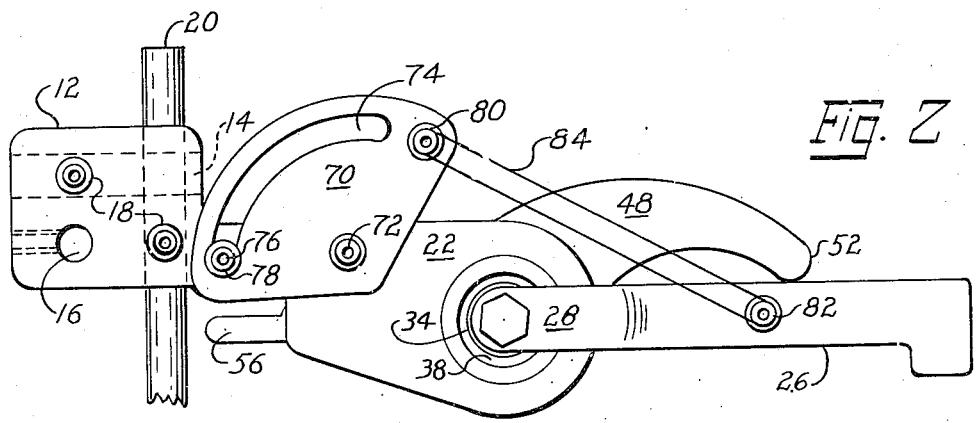
Figure 2 is a view in side elevation of the gauge holder fitted with resilient means acting to bring an indicator carried by the gauge holder against downwardly facing surfaces.

The parts so far described enable an indicator mounted on the pivoted arm to be brought against a piece of work by a movement in a downward direction and the arm will rest against the stop due to the weight of the arm and indicator. However, in practice, it is frequently necessary to gauge parts having surfaces directed downwardly or with surfaces extending substantially vertically, and in order to bring the pivoted arm 26 against the stop with a constant pressure under such conditions, I provide resilient means for counteracting the weight of the arm and indicator mounted thereon, or for moving said arm and indicator in a substantially horizontal plane. Various arrangements of resilient means may be readily devised but that shown in Figure 2 has been found very satisfactory and simple to produce. A sector shaped plate 70 is pivoted by stud 72 to the head 22 of the supporting arm. An arcuate slot 74 is provided in the plate 70 and a threaded stem 76 is screwed into the supporting arm through said slot. A knurled nut 78 serves to lock the plate in any desired position within the range permitted by the arcuate slot. An abutment 80 is arranged on the plate 70 and a second abutment 82 is arranged on the pivot arm 26. A resilient element 84 is connected between said abutments. I have found that one or more rubber bands function well as a resilient element since change in strength of the element can be readily effected by increasing or decreasing the number of rubber bands used. It is pointed out that the construction is such that the pivoted arm 26 is held by the resilient means in either the operative position against the stop member or in inoperative position when moved past dead center in one or the other direction.

In operation, the gauge may be used either mounted on a machine, for instance on the bed of a lathe, or mounted on a bed plate A as illustrated in Figure 4, used for inspection of a plurality of parts which comprise points which have to be within a given tolerance. The bed plate A is furnished with undercut grooves running from edge to edge of the plate. The edges of the grooves act to scrape dust and dirt from the surfaces of the parts being tested as well as from the underside of blocks used to support the gauges and thus have a definite cleaning action, as well as facilitate the clamping of parts on the face plate which may require holding. The gauge holder is shown as mounted on a rod 20 fitted in a magnetic block C placed on the face plate. It is pointed out that the function of the stop is to arrest the pivoted arm in a position such that the operating stem of the dial indicator is moved only part way of its travel. This is accomplished by releasing the clamp 54, adjusting the stop member 48 and tightening the clamp 54. It is necessary to clamp the stop member firmly in position but it is desirable to avoid transfer of stress to the ball bearings. It will be seen from the construction illustrated in Figure 3 that the outer race is constituted by the heavy bushing 32 which is sufficiently rigid to assume the stresses without distortion. It is evident that other suitable friction reducing construction could be devised for interposition, in the head, between the pivoted gauge-supporting arm and the stop arm, without departing from the essence of the invention. The reading given by the dial indicator in this adjusted position serves as the zero mark, the dial preferably being rotated to bring the zero mark under the indicator hand. The initial reading and setting to zero is, of course, made with a perfect or master part. The pivoted arm is then swung away so that its weight or the action of the resilient means described holds the arm in inoperative position, and a duplicate production part is placed in the identical position on the face plate previously occupied by the master part. The pivoted arm is then brought again against the surface or point which the gauge is set to check, and the reading of the indicator will obviously give the variation, if any, of the production part and whether the variation is plus or minus. If more than one point or surface on a part is to be checked, for instance, one with an upper and a lower surface as shown in Figure 4, two gauges can be set up as described. The readings obviously will not only serve to compare the production part with the master part but will give the nature and amount of any difference, so that by reworking a part giving a plus reading of more than the plus tolerance to reduce the dimension by the required amount as indicated by the gauge, the part may be saved from scrapping.

The ability of the universal gauge holder to enable any desired number of readings to be taken with one setting and to be moved about while holding this setting and to take readings of uniform accuracy in any plane render the device of my invention of great utility, as it facilitates and speeds up the work of inspection very markedly, thus increasing output while reducing the cost and labor of inspection.

I claim:

1. A gauge holder comprising: a supporting arm provided at one end with bores at angles to one another and with set screws positioned in said end of the arm to be projectable into said bores; a support for said arm comprising a rod received in one of said bores and clamped therein by one of said set screws; a head formed at the end of said supporting arm opposite said bored end, said head being slotted inwardly from its end face; a bushing pressed into and extending through a bore in said head from one side to the other and across the slot in said head; a row of ball bearings within and adjacent each end of said bushing; an inner member held by said balls against axial or radial movement relatively to said bushing; a pivot member fitting closely in an axial bore formed through said inner member; a pivoted arm having a yoke-shaped end straddling said head, an end of the pivot member passing through a bore in each leg of the yoke; an enlarged head on said pivot member engaging against the outside of one leg of said yoke and a nut on a threaded portion of the opposite end of said pivot member bearing against the outside surface of the other leg of said yoke whereby said legs may be securely clamped against the ends of said inner member; a finger-like stop member having an enlarged end bore and journaled in said slot in the head of said supporting arm on the exterior surface of said bushing and having the free end thereof formed to provide a rounded stop surface adapted to contact the pivoted arm toward the free end thereof; readily releasable locking means arranged in a recess in the head of the supporting arm, said locking means comprising a member engageable against the surface of the enlarged end of the stop member journaled on said bushing; a dial indicator having a stem held in a bore formed at the free end of said pivot arm and retained therein by a set screw mounted in the end of the arm to engage the stem of the indicator; a slotted sector shaped plate pivoted on the head of the supporting arm between the pivot member and the end of said arm provided with said bores for mounting the arm on a support; an abutment mounted on said slotted plate; a threaded stem engaged in said head and extending through the slot in said plate, and a nut mounted on said threaded stem to frictionally retain said plate in adjusted position; an abutment mounted on said pivoted arm toward the free end thereof; and resilient tensioning means anchored at one end to one of said abutments and the other end to the other of said abutments, whereby the tensioning means can be adjusted for different adjusted positions of the stop member by adjustment of the position of the sector shaped plate on the head of the supporting arm.

2. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a row of ball bearings within and adjacent each end of said bushing; an inner member held by said balls against axial or radial movement relatively to said bushing; a pivot member fitting closely in an axial bore formed through said inner member; a pivoted arm having a yoke-shaped end straddling said head, an end of the pivot member passing through a bore in each leg of the yoke, means being provided to retain said pivot member and yoke in operative relation whereby said legs may be securely clamped against the ends of said inner member mounted in the head of the supporting arm; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member arranged in a recess in said head of the supporting arm, said locking means comprising a member engageable against the surface of the enlarged end of the stop member journaled on said bushing; a dial indicator having a stem held in a bore formed at the free end of said pivot arm and retained therein by a set screw mounted in the end of the arm to engage against the stem of the indicator; a slotted sector shaped plate pivoted on the head of the supporting arm between the pivot member and the supported end of said arm; an abutment mounted on said slotted plate; a threaded stem engaged in said head and extending through the slot in said plate, and a nut mounted on said threaded stem to frictionally retain said plate in adjusted position; an abutment mounted on said pivoted arm toward the free end thereof; and resilient tensioning means anchored at one end to one of said abutments and the other end to the other of said abutments, whereby the tensioning means can be adjusted for different adjusted positions of the stop member by adjustment of the sector shaped plate on the head of the supporting arm.

3. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a row of ball bearings within and adjacent each end of said bushing; an inner member held by said balls against axial or radial movement relatively to said bushing; a pivot member fitting closely in an axial bore formed through said inner member; an arm having a yoke-shaped end straddling said head, an end of the pivot member passing through a bore in each leg of the yoke, means being provided to retain said pivot member and yoke in operative relation whereby said legs may be securely clamped against the ends of said inner member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means arranged in a recess in said head of the supporting arm, said locking means comprising a member engageable against the surface of the enlarged end of the stop member journaled on said bushing; and a dial indicator having a stem held in a bore formed at the free end of said pivot arm and retained therein by a set screw mounted in the end of the arm to engage against the stem of the indicator.

4. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member fitting closely within said bushing; a pivoted arm having a yoke-shaped end straddling said head, an end of the pivot member passing through a bore in each leg of the yoke, means being provided to retain said pivot member and yoke in operative relation whereby said legs may be securely held on said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means arranged in a recess in said head of the supporting arm, said locking means comprising a member engageable against the surface of the enlarged end of the stop member journaled on said bushing; a dial indicator having a stem held in a bore formed at the free end of said pivot arm and retained therein by a set screw mounted in the end of the arm to engage against the stem of the indicator; a slotted sector shaped plate pivoted on the head of the supporting arm between the pivot member and the supported end of said arm; an abutment mounted on said slotted plate; a threaded stem engaged in said head and extending through the slot in said plate, and a nut mounted on said threaded stem to frictionally retain said plate in adjusted position; an abutment mounted on said pivoted arm toward the free end thereof; and resilient tensioning means anchored at one end to one of said abutments and the other end to the other of said abutments, whereby the tensioning means can be adjusted for different adjusted positions of the stop member by adjustment of the sector shaped plate on the head of the supporting arm.

5. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member fitting closely within said bushing; a pivoted arm having a yoke-shaped end straddling said head, an end of the pivot member passing through a bore in each leg of the yoke, means being provided to retain said pivot member and yoke in operative relation whereby said legs may be securely held on said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means arranged in a recess in said head of the supporting arm, said locking means comprising a member engageable against the surface of the enlarged end of the stop member journaled on said bushing; and a dial indicator having a stem held in a bore formed at the free end of said pivot arm and retained therein by a set screw mounted in the end of the arm to engage against the stem of the indicator.

6. A gauge holder comprising: a supporting arm provided at one end with means for adjustably mounting said arm relatively to a part to be checked; a head formed at the end of said supporting arm opposite said end provided with means for mounting the arm, said head being slotted inwardly from its end face; a bushing pressed into and extending through a bore in said head from one side to the other and across the slot in said head; a pivot member fitting closely within said bushing; a pivoted arm having a yoke-shaped end straddling said head, an end of the pivot member passing through a bore in each leg of the yoke; means acting to retain said pivot member and yoke in operative relation whereby said legs may be securely held on said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means arranged in a recess in said head of the supporting arm, said locking means comprising a member engageable against the surface of the enlarged end of the stop member journaled on said bushing; a dial indicator having a stem held in a bore formed at the free end of said pivot arm and retained therein by a set screw mounted in the end of the arm to engage against the stem of the indicator; and resilient means acting to bring the pivoted arm against the stop surface of said finger-like stop member when the indicator is applied to the work and to hold said pivoted arm in inoperative position when the indicator is moved away from the work.

7. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member mounted in said bushing; anti-friction means arranged between said pivot member and said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member carried by the supporting arm, said locking means comprising a member engageable against the surface of the enlarged end of the stop member journaled on said bushing; a dial indicator having a stem held in a bore former at the free end of said pivot arm and retained therein by a set screw mounted in the end of the arm to engage against the stem of the indicator; a slotted sector shaped plate pivoted on the head of the supporting arm between the pivot member and the supported end of said arm; an abutment mounted on said slotted plate; a threaded stem engaged in said head and extending through the slot in said plate, and a nut mounted on said threaded stem to frictionally retain said plate in adjusted position; an abutment mounted on said pivoted arm toward the free end thereof; and resilient tensioning means anchored at one end to one of said abutments and the other end to the other of said abutments, whereby the tensioning means can be adjusted for different adjusted positions of the stop member by adjustment of the sector shaped plate on the head of the supporting arm.

8. A gauge holder comprising: a supporting arm provided at one end with means for adustably mounting said arm relatively to a part to be checked; a head formed at the end of said supporting arm opposite said end provided with means for mounting said arm, said head being slotted inwardly from its end face; a bushing pressed into and extending through a bore in said slotted head from one side to the other and across the slot; a pivot member mounted in said bushing; anti-friction means arranged between said pivot member and said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member arranged in a recess in said head of the supporting arm, said locking means comprising a member engageable against the surface of the enlarged end of the stop member journaled on said bushing; and indicating means mounted at the free end of said pivot arm and retained therein by a set screw mounted in the end of the arm to engage against the stem of the indicator.

9. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member mounted in said bushing; anti-friction means arranged between said pivot member and said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a fingerlike stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member, said locking means comprising a member engageable against the surface of the enlarged end of the stop member journaled on said bushing; indicating means mounted on the free end of said pivoted arm; and resilient means acting to hold said pivoted arm against said stop during the gauging operation and to retain said pivoted arm in inoperative position at other times.

10. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said slotted head from one side to the other and across the slot; a pivot member mounted in said bushing; anti-friction means arranged between said pivot member and said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member including a shoe engaging against the surface of enlarged end of the stop member journaled on said bushing within said head and a part operable to force said shoe against said surface to prevent rotation of said stop member on said bushing; and indication means mounted at the free end of said pivot arm and retained therein by a set screw mounted in the end of the arm to engage against the stem of the indicator.

11. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member mounted in said bushing; anti-friction means arranged between said pivot member and said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a finger-like stop member having an enlarged end bored and journaled in said slot in the head of said supporting arm on the exterior surface of said bushing and having the free end thereof formed to provide a stop surface adapted to contact the pivoted arm toward the free end thereof; readily releasable locking means for said stop member including a shoe engaging against the surface of enlarged end of the stop member journaled on said bushing within said head and a part operable to force said shoe against said surface to prevent rotation of said stop member on said bushing; indicating means mounted on the free end of said pivoted arm; and resilient means acting to hold said pivoted arm against said stop during the gauging operation and to retain said pivoted arm in inoperative position at other times.

12. A gauge holder comprising: a supporting arm provided at one end with means for adjustably mounting said arm relatively to a part to be checked; a head formed at the end of said supporting arm opposite said end provided with means for mounting said arm, said head being slotted inwardly from its end face; a bushing pressed into and extending through a bore in said head from one side to the other and across the slot in said head; a pivot member mounted in said bushing; a pivoted arm having a yoke-shaped end straddling said head, an end of the pivot member passing through a bore in each leg of the yoke; means acting to retain said pivot member and yoke in operative relation whereby said legs may be securely clamped against the ends of said pivot member; a finger-like stop member having an enlarged end bore and journaled in said slot in the head of said supporting arm on the exterior surface of said bushing and having the free end thereof formed to provide a stop surface adapted to contact the pivoted arm toward the free end thereof; a cam mounted in a recess in said head; a cam-operating lever projecting from said head; a displaceable member adapted to be forced by said cam against the surface of the stop member journaled on said bushing, said cam lever and displaceable member constituting locking means to hold the stop member in adjusted position; indicating means mounted on the free end of said pivoted arm; and resilient means connected between an abutment on the supporting arm and an abutment mounted on the pivoted arm, the abutment on the pivoted arm being nearer the abutment on the head when the pivoted arm is in operative or inoperative position than while being moved to one position or the other so that said resilient means acts to move said pivoted arm to the operative position in which the arm contacts the stop, or to the inoperative position, when said arm is moved past dead center toward the one or the other of said positions.

13. A gauge holder comprising: a support; a supporting arm mounted on said support; a pivoted arm mounted on said supporting arm; a stop member adjustably mounted on said supporting arm and acting to limit the movement of the pivoted arm toward the work to be gauged; and resilient means arranged under tension between said supporting arm and said pivoted arm to pull said pivoted arm against said stop.

14. A gauge holder, including: a support member; a support for said member; a head disposed at the inner end of said supporting member; a pivot member disposed in said head; a gauge-supporting arm mounted at the one end thereof on said pivot; a stop member pivoted at the one end to said head and adapted at the other end to contact said gauge-supporting arm so as to unidirectionally limit the movement of said arm; and locking means in said head for immobilizing said stop member in desired position, whereby the inner end of said arm may first be swung to apply a gauge mounted thereon against a master part and then against duplicates thereof and with substantially equal pressures, thereby to produce accurate gauge readings of deviations of said duplicates from said master.

15. A gauge holder, including: a support member; a support for said member; a head disposed at the inner end of said supporting member; a pivot member disposed in said head; a gauge-supporting arm mounted at the one end thereof on said pivot; a stop member having the one end radially enlarged and pivoted in said head and adapted at the other end to contact said gauge-supporting arm; and locking means in said head for immobilizing said stop member in desired position and including a shoe movable against the periphery of said radial enlargement and means for moving said shoe as aforesaid.

EDWARD H. ROSE.

REFERENCES CITED

The following references are of record in the file of this patent:

UNITED STATES PATENTS

| Number | Name | Date |
|---|---|---|
| 1,079,169 | Fuchs | Nov. 18, 1913 |
| 1,157,762 | Common | Oct. 26, 1915 |
| 1,206,668 | Caron | Nov. 28, 1916 |
| 1,319,361 | Rouanet | Oct. 21, 1919 |
| 2,201,454 | Riech | May 21, 1940 |